Parkin & Tretheway.
Tempering Steel.
No. 92,747. Patented Jul. 20, 1869.

Witnesses:
R. C. Drenshall
T. B. Kerr.

Inventor:
Charles Parkin,
Samuel Tretheway.
by Bakewell & Kerr
their att'ys.

United States Patent Office.

CHARLES PARKIN AND SAMUEL TRETHEWEY, OF PITTSBURG, PENNSYLVANIA.

Letters Patent No. 92,747, dated July 20, 1869.

IMPROVEMENT IN TEMPERING STEEL CASTINGS.

The Schedule referred to in these Letters Patent and making part of the same.

*To all whom it may concern:*

Be it known that we, CHARLES PARKIN and SAMUEL TRETHEWEY, of Pittsburg, in the county of Allegheny, and State of Pennsylvania, have invented a new and useful Improvement in Tempering Steel; and we do hereby declare the following to be a full, clear, and exact description thereof.

For many purposes in the arts, rolls are required which possess a face such as can best be obtained from hardened steel, and at the same time it is exceedingly desirable that the bearings of such rolls should remain untempered.

Practically it has been found exceedingly difficult to give to the face, or cylindrical surface of the steel roll, the desired temper, without subjecting the journals or bearings of such rolls, partially at least, to the action of such tempering-process.

By our invention, we employ the usual mode of tempering the face of the body of the roll, viz, by heating and immersing in cold water; but before immersing, we protect the heated journals, or bearings from the coming in contact with the water, by placing a cap over each, and drawing the caps tightly against the ends of the body of the roll, so as to make a water-tight joint at each end, which is done by the use of bolts passing through flanges on the caps, and keyed or otherwise drawn up to the required degree of tightness.

To enable others skilled in the art to make and use our invention, we will proceed to describe its construction and manner of use, with reference to the accompanying drawing, making a part of this specification, in which—

Like letters of reference indicate like parts in each.

Figure 1:
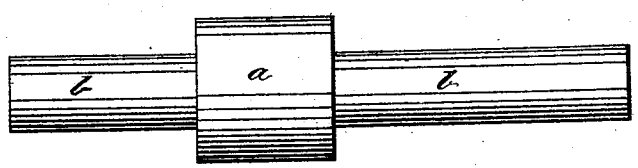
Figure 1 is a side view of a steel roll.
Figure 2:
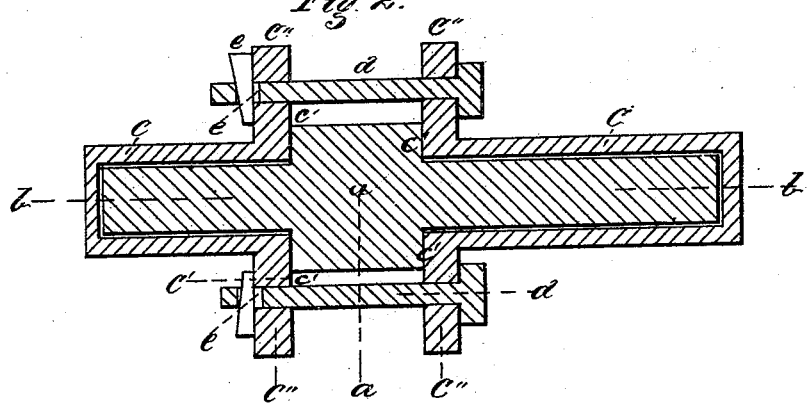
Figure 2 is a longitudinal section of the roll and caps, the latter being bolted and keyed in place.
Figure 3:
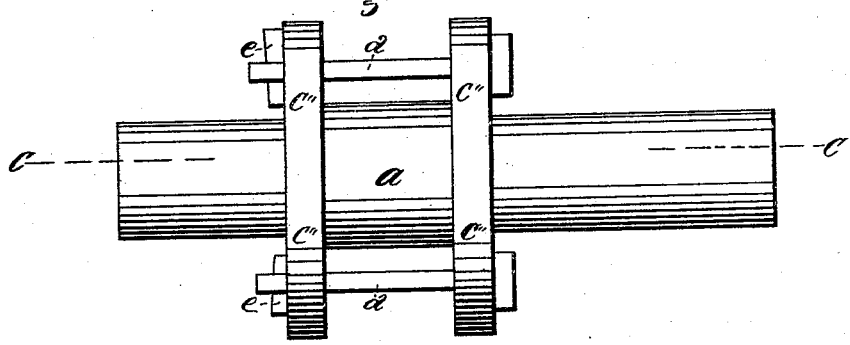
Figure 3 is a side view of the same.

The cylindrical body $a$ and the bearings $b\ b$ of the roll are made in any known way, or of any desired size.

If, now, this roll be raised to a tempering-heat, and plunged into cold water, the journals $b\ b$ will be tempered or hardened, as well as the body $a$.

To preserve the journals $b\ b$ untempered, after the roll is heated, I place on each of the journals $b\ b$, a metallic cap, $c$.

The base of $c'$ of each of these caps, and the ends $a$ of the body of the roll, are so made by turning, if need be, that when the caps are drawn up, as presently to be described, such bases $c'$ will make water-tight joints with the ends of the body $a$ of the roll. But, if so preferred, a metallic packing, infusible at the tempering-heat employed, may be used for making such joint.

The caps $c$ are made with flanges $c''$ projecting outwardly sufficiently far so that, through bolt-holes in them, bolts $d$ may be passed through from one end to the other.

Then, by wedge-shaped keys $e$ passing through key-holes $e'$, I draw the caps $c$ together, so as to make their bases $c'$ press tightly against the ends of the body $a$ of the roll, either with or without an interposed packing.

But the bolts $d$ may have threaded ends, and nuts be employed instead of keys, or other similar mode of drawing the caps against the ends of the body $a$ may be substituted, though the devices described are preferable, as it is desirable to do the work rapidly, so that the temperature of the roll shall not fall below a tempering-heat before it is immersed in the cold water.

The last-named step follows next.

The roll remains in the water till the hardening or tempering of the face of the body $a$ is complete, when it is removed, the caps $c$ taken off, and the journals $b\ b$ allowed to cool slowly.

In this way, we secure the hardened or tempered face required in the body $a$ of the roll, and leave the journals $b\ b$ untempered, which is the end aimed at.

In the application of our invention, we do not confine ourselves to its use in connection with steel rolls only, but also apply it to other articles of steel in which it is desirable to temper one part and leave another untempered, and in which articles each part to be preserved untempered can be protected from the action of the water by a metallic cap placed thereon, so that such cap shall, at its base, make a water-tight joint therewith, or with the part to be tempered, in the manner substantially as above set forth.

What we claim as our invention, and desire to secure by Letters Patent, is—

1. In tempering rolls or other articles made of steel, enclosing the part or parts to be preserved from the action of the tempering-agent by a metallic cap placed on each, so as to make a water-tight joint at its base, substantially as above set forth.

2. In the process of tempering the body of a steel roll, the use of caps $c$, having outwardly-projecting flanges $c'$, and so made that their bases can be drawn tightly against the ends of the body $a$ of the roll, with or without interposed packing, substantially as above set forth.

In testimony whereof, we, the said CHARLES PARKIN and SAMUEL TRETHEWEY, have hereunto set our hands.

CHARLES PARKIN.
SAMUEL TRETHEWEY.

Witnesses:
JOHN GLENN,
T. B. KERR.